United States Patent [19]
Schmidt

[11] Patent Number: 5,945,001
[45] Date of Patent: Aug. 31, 1999

[54] METHOD FOR THE PURIFICATION AND RECOVERY OF WASTE GELATIN USING DIAFILTERS

[75] Inventor: William Schmidt, Dresher, Pa.

[73] Assignee: A.B. Technologies, L.L.C., Dresher, Pa.

[21] Appl. No.: 09/033,679

[22] Filed: Mar. 3, 1998

[51] Int. Cl.$^6$ ..................................................... B01D 61/14
[52] U.S. Cl. ......................... 210/650; 210/773; 210/774; 210/800; 210/805; 210/806; 530/355
[58] Field of Search ..................................... 210/650, 773, 210/774, 800, 805, 806; 530/355

[56] References Cited

U.S. PATENT DOCUMENTS 5,074,102 12/1991 Simpson et al. .
5,288,408  2/1994 Schmidt et al. .

Primary Examiner—Robert J. Popovics
Attorney, Agent, or Firm—Watov & Kipnes, P.C.

[57] ABSTRACT

A process for the recovery and purification of waste gelatin, especially from the manufacture of soft gelatin capsules includes the steps of effecting dissolution of the gelatin and other water-soluble components of the waste in a solvent such as deionized water such that a gelatin-containing solution dispersed within the remaining components of said waste is formed, permitting the dispersion to settle into an upper oil phase and a lower solvent based gelatin-containing solution phase, separating the lower phase from the upper phase, optionally hot filtering the lower phase to remove traces of the remaining components of the upper phase, and diafiltering the lower phase to remove the active ingredients, glycerin, and other water-soluble components and to provide a recycled gelatin solution.

19 Claims, 2 Drawing Sheets

5,945,001

METHOD FOR THE PURIFICATION AND RECOVERY OF WASTE GELATIN USING DIAFILTERS

FIELD OF THE INVENTION

This invention is generally directed to a process for recycling gelatin waste and derivatives thereof and in particular, to a process for recycling gelatin waste and its derivatives resulting from industrial encapsulation processes.

BACKGROUND OF THE INVENTION

Gelatin and gelatin derivatives are used to encapsulate the products of several industries. Examples are described in U.S. Pat. No. 5,074,102, issued to Simpson et al, and include the encapsulation of medicinal compounds such as drugs and vitamins; employment of gelatin encapsulation in food packaging, such as for powdered instant coffee or spices; in candy manufacturing; in fertilization of ornamental plants and/or indoor plants; in packaging of sensitive seeds in combination with protective agents and/or fertilizers; and in the packing of single dyestuffs or mixtures of various drugs.

In each of the above-recited manufacturing and production processes, a certain amount of the encapsulating material is lost as waste. Frequently, this amount approaches 50% or more of the total starting material, depending on the arrangement of production employed. When considering that the cost of the encapsulating material in the United States averages approximately $3.10 per pound ($6.82 per kilo) as of September, 1997, it is clear that the economic consequences of such waste can be significant. As a result, manufacturers have attempted to off-set poor production efficiency by recycling the waste material for reuse. Such attempts, however, have not been met with a great deal of success.

Prior art methods of gelatin recovery and purification suffer from a variety of shortcomings to be discussed in further detail below. Before these shortcomings can be fully appreciated, however, the composition of the encapsulation waste material itself should be further understood. In general, waste material of encapsulation processes are comprised of a variable number of components added to a gelatin base. Among them are solvents (usually water); softening agents and oil coatings (when desired); and, contaminants in the form of residual active ingredients, i.e. the substance being encapsulated. In addition, colorings and preservatives may also be added. Thus, it can be observed that successful recycling involves not only the recovery of gelatin from surrounding oils, but also the removal of the remaining components of the waste in order to achieve a relatively pure, reusable product.

Extraction has been the principle method for accomplishing removal of oils, actives and the like in the pharmaceutical industry. While several solvents have been used in the prior art in an effort to accomplish separation, each suffer from a variety of shortcomings not the least of which is the necessity of ultimately removing yet another component, i.e. the solvent itself, from the recycled materials. To date, the most popular and widely used solvents used to separate gelatin from oils and actives are chlorinated solvents such as, for example, 1,1,1, -trichloroethane with naphtha. The use of chlorinated solvents, however, is accompanied by high costs, disposal problems, and most importantly, environmental concerns. Attempts have been made to use other solvents including isopropyl alcohol, methyl isobutyl ketone, toluene, hexane, heptane, acetone, and acetone/water mixtures, but the resulting yields are insufficient and/or the separation is poor. Furthermore, some of these chemicals are relatively expensive and present similar environmental, disposal, and safety concerns as the chlorinated solvents. None of them have been found to separate oils and actives with a high degree of efficiency.

U.S. Pat. No. 5,288,408, issued to Schmidt et al, discloses a method of recycling gelatin-based encapsulation waste material, and more specifically, to a process for the recovery and purification of gelatin and softening agents therefrom. In the preferred embodiment, deionized water is added to the waste material thereby forming an aqueous solution of gelatin and glycerin dispersed within the remaining oil and residual active-ingredient components of the waste material. Extraction methods are employed under specific conditions to effect separation of the lower aqueous phase from the upper oil phase. The lower phase is hot filtered to remove any remaining traces of oil or other contaminants and the filtrate is then charged to a concentration vessel adapted for vacuum distillation. The water solvent is thus removed under specific thermal and atmospheric conditions until the desired concentration of gelatin and glycerine is achieved. A pure, concentrated aqueous gelatin-glycerin solution results which may be stored or further prepared for immediate reuse. Although this process lends itself to the removal of dyes and active ingredients with additional chemical reactions and processing, such dyes, active ingredients, and glycerin are not removed in situ.

It would, therefore, be desirable to provide a method for recycling gelatin-based encapsulation waste material that removes dyes, active ingredients, and glycerin in situ without the need for any additional processing.

SUMMARY OF THE INVENTION

Generally, a process for the purification and recycle of waste gelatin, active ingredients, and glycerine resulting from the manufacture of soft gelatin capsules is provided in accordance with the invention. In its broadest aspects, the process of the present invention includes the steps of effecting dissolution of the gelatin, active ingredient, glycerin, and other water-soluble components of the waste in a solvent such that a gelatin-containing solution dispersed within the remaining components of the waste is formed, separating the lower phase from the upper phase, and diafiltering the lower phase to remove the active ingredients, glycerin, and other water-soluble components and to provide at least a substantially purified aqueous gelatin solution.

In a preferred form of the invention, the solution dispersed within the remaining components of the solution is permitted to settle into a lower phase and an upper phase. The lower phase is then, optionally, hot filtered to remove traces of the remaining components of the upper phase and then the hot filtered lower phase is diafiltered.

If dyes and pigments in the waste gelatin have an affinity for the gelatin, it may be necessary to take appropriate steps to eliminate this affinity prior to the diafiltration step. This affinity can be eliminated by use of, for example, activated clay, carbon cartridge filtration; carbon slurry formation followed by filtration to remove the carbon; pH adjustment to eliminate adhesion of the dye to the gelatin, followed by direct diafiltration to remove the dyes, and then adjustment of the pH back to the normal processing pH; or, by a combination of these methods.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

The following drawings are illustrative of embodiments of the invention and are not intended to limit the invention as encompassed by the claims forming part of the Application.

DETAILED DESCRIPTION OF THE PREFERRED EMBODIMENTS

Gelatin is a protein derivative of collagen obtained, in general, by the boiling of skin, white connective tissues, and bones of animals, and by the partial hydrolysis of collagen, in particular. As a colloid it has unique physical properties. Of particular significance to the present invention is its tendency to stay in solution and its ability to form dispersions in oils. Gelatin remains a solid at standard atmospheric pressure and temperature absent the presence of a sufficient quantity of solvent.

Softening agents are sometimes added to plasticize the gelatin when soft, globular, gelatin shells are desired. Agents such as glycerin, sorbitol, or other similar polyols are commonly employed to achieve these characteristics.

The soft elastic capsule-forming material will thus be used to enclose active ingredients in the form of powders, liquids, or combinations thereof. Oils, such as vitamin A, vitamin E, and beta-carotene, for example, are frequently encapsulated in the pharmaceutical, cosmetic and nutritional industries. Additionally, other oils like mineral oil or medium chain triglycerides (MCT's) may be used to coat the outer surface of the gel-capsule during processing. Thus, it can be seen that the waste product of the encapsulation process may have many components which must be removed before the gelatin waste is available for reuse as a relatively pure product. In some instances, coloring agents and preservatives may also be incorporated into the encapsulation melt. Commonly used preservatives include methylparaben, propylparaben, and sorbic acid.

As stated above, present methods of encapsulation lose as much as 50% or more of the melt during processing, the balance of which is either discarded as a waste by-product or recycled. The latter option requires the removal of all of the above components. The present invention provides a novel and efficient method of accomplishing recycling without experiencing the shortcomings of the prior art. It will be understood that other proteins with physical and chemical properties similar to gelatin exist and may also be recycled by the process provided in accordance with the present invention. Similarly, glycerine is only one example of a softening agent which may be recovered; thus, neither gelatin nor glycerine are intended to be limiting.

Figure 1:
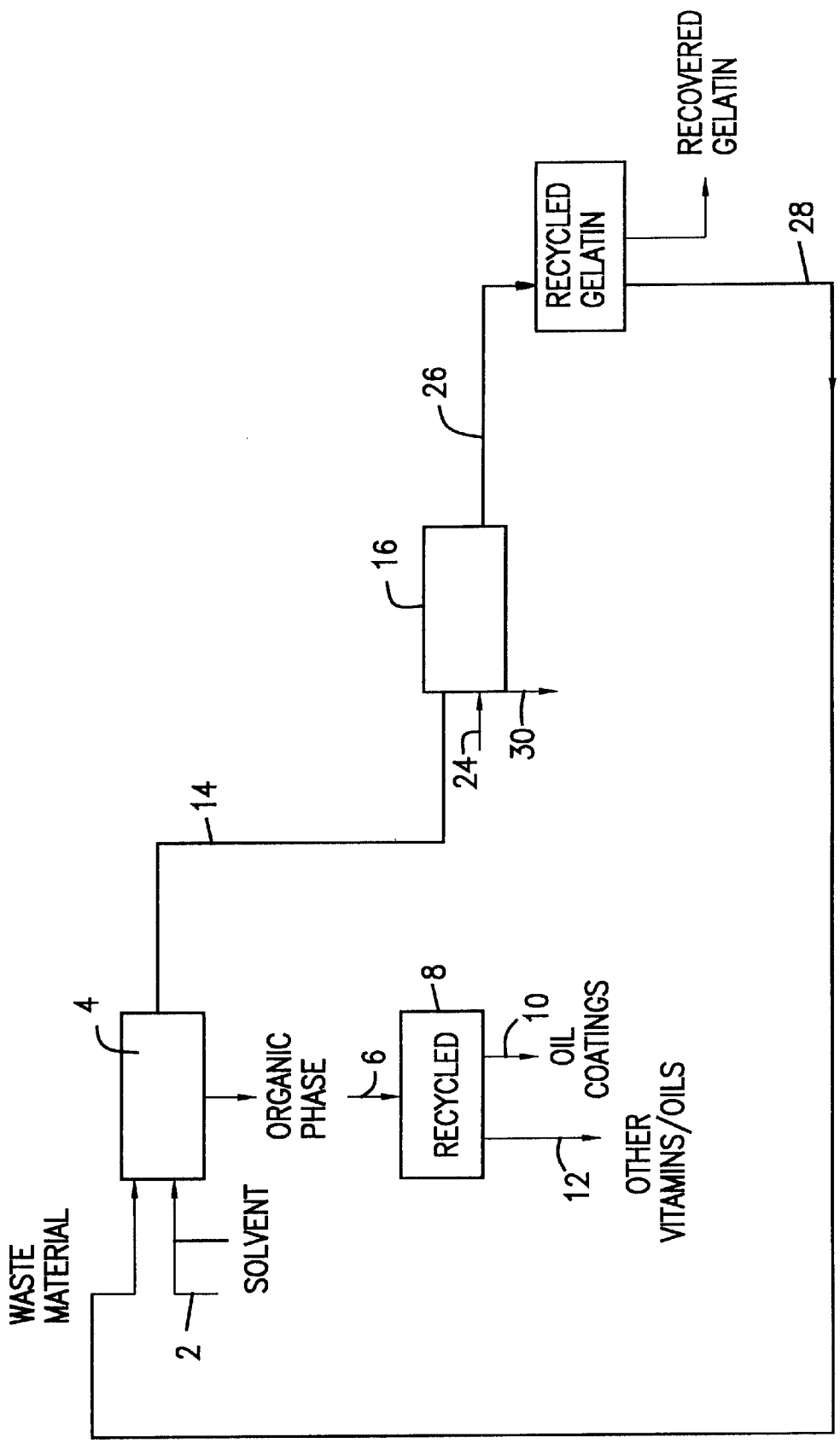
FIG. 1 is a schematic view of an embodiment of the method of gelatin recovery and purification provided in accordance with the present invention.

Reference is now made to FIG. 1 wherein an embodiment of the present invention for the recovery and purification of gelatin is illustrated. A gelatin solvent such as deionized water is added through a conduit 2 to a separation vessel 4 adapted with a heating jacket known in the art and is preheated to a temperature sufficient to maintain the gelatin in a flowable condition, as for example from about 45° and 70° C. The waste material to be recycled is then charged to the separation vessel 4 which may be of stainless steel or glass-lined steel construction and sized according to batch size. The vessel 4 may also be provided with conventional agitation means (not shown). The waste material to be recovered is diluted with the solvent (e.g. deionized water) typically at about atmospheric pressure and to a preferred concentration of up to about 25% gelatin by weight. Dilution is preferably carried out at an elevated temperature (e.g. from about 45 to 70° C.). Agitation may be simultaneously performed to effect dissolution of the gelatin and glycerin, which should be almost immediate.

A solution of gelatin is thus formed and dispersed within the remaining oil and residual active-ingredient components. The above recited concentration level (up to about 25% by weight) is a preferred concentration for achieving rapid and thorough separation of an upper organic layer from a lower solvent based layer (e.g. aqueous layer). The upper organic layer is discarded or sent via a conduit 6 to a recycling system 8 which is known in the art. If recycled, the organic phase may be separated into oil coatings which emerge via a conduit 10 and vitamins and other oils through a conduit 12.

Once the gelatin is completely dissolved, agitation is terminated and the entire mass is allowed to stand. For a batch size of about 150 kilograms for example, it was observed that approximately 1–3 hours were required for separation. Separation of the lower aqueous phase from the upper oil phase can be facilitated by a sight glass incorporated into the recycling apparatus. Accordingly, differences between the two phases is visually determined to effect accurate separation. Furthermore, extraction of the lower solvent based layer can be carried out through a heated transfer conduit 14 to avoid solidification of the solution. A temperature range of, for example, from about 30° to 40° C. is suitable from transporting the solvent based layer. As previously indicated, the upper phase may contain the lubricating or coating oils, active ingredients, coloring agents and preservatives which may themselves be subject to certain recycling techniques known in the art. Because the subject invention provides for efficient separation of gelatin from the waste, the remaining components on the upper phase will similarly have a greater degree of purity. The present invention, therefore, provides a method for the more efficient recovery of active ingredients. This is particularly useful when the amount of waste active ingredient is relatively high because of the process of encapsulating the active ingredients is relatively inefficient. Recovery and purification of the active ingredients can result in significant cost savings.

In the embodiment shown in FIG. 1, the solvent based layer which may be heated as discussed above is sent via the conduit 14 to a diafiltration system 16 as hereinafter described to yield a concentrated recyclable gelatin product.

Figure 2:
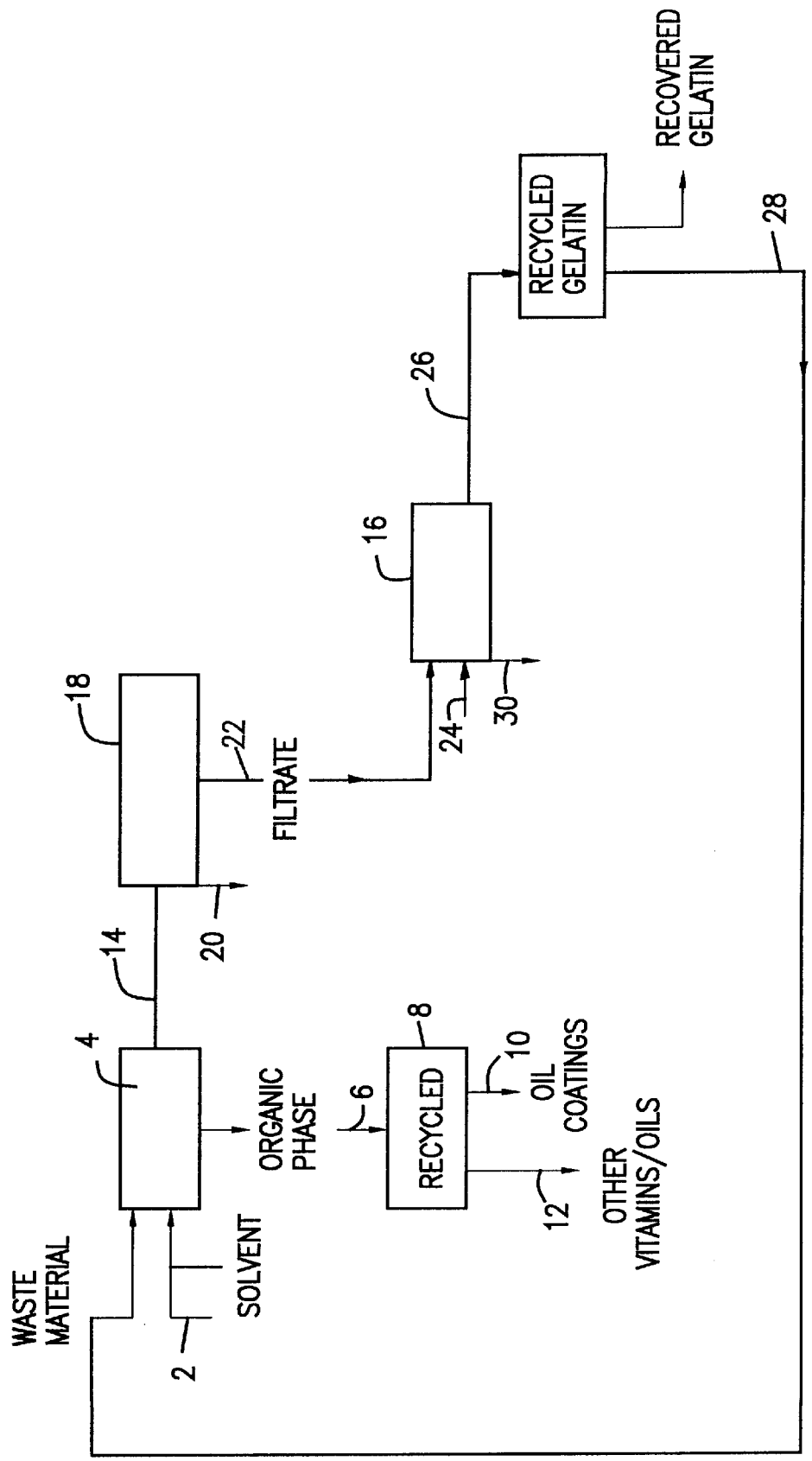
FIG. 2 is a schematic view of a further embodiment of the method of gelatin recovery and purification in accordance with the present invention.

In the embodiment shown in FIG. 2, the solvent based layer containing the recyclable gelatin may be sent to a hot filtration assembly 18. The hot filtration assembly 18 is particularly desirable if the solvent based layer contains particulate matter.

In particular, the lower phase may optionally be heated, preferably hot filtered in the filtration assembly 18 if particulates are present at a temperature of approximately the same as above (i.e. from about 45 to 70° C.) to remove any remaining traces of oil or other contaminants through a conduit 20. Filtration equipment may be employed such as a plate filter, or a coated plate filter like, for example, a sparkler filter. The preferred material of construction is stainless steel. Alternatively, nutche filters of the Rosenmund type or cartridge filters may be used for the purpose. Here again, the residue may be recaptured for further separation and purification if desired, although the amounts involved at this point may not warrant the effort.

The filtrate from the optional hot filtration assembly 18 as shown in FIG. 2 is then transported via a conduit 22 to the diafiltration assembly 16 to remove residual active ingredients, glycerin, water, and other water-soluble components such as preservatives and dyes and to provide recycled gelatin in a form that is of sufficient purity and quality to permit reuse.

Diafiltration is a technique using ultrafiltration membranes to remove or fractionate different size molecules in macromolecular solutions. An ultrafiltration membrane retains macromolecules that are larger than the nominal molecular weight limit (NMWL) of the membrane and freely passes molecular species which are significantly smaller than the NMWL of the membrane. Macromolecules retained by the membrane are concentrated, while the low molecular weight species are removed. Typically, the macromolecules must be "washed" using multiple wash volumes to remove residual smaller molecules, hence the name diafiltration (i.e. filtration using ultrafiltration membranes and washing).

For continuous diafiltration, a supply of macromolecules (e.g. gelatin) is added via the conduit 22 to the diafiltration assembly 16 at the same rate as the filtrate is being removed. This is also referred to as constant volume diafiltration. The concentration of the macromolecules does not change during the diafiltration process.

Discontinuous diafiltration involves first concentrating the macromolecule (e.g. gelatin) batch to a predetermined volume, and then reconstituting the sample to its original volume with replacement solvent. This is repeated until the smaller molecules are removed.

Referring to FIGS. 1 and 2 diafiltration may be accomplished by first heating the system from about 50° C. to 65° C. by recirculating heated, deionized water typically for about 15 minutes. The hot, aqueous feed stream is then pumped through the assembly 16 via a conduit 24 and concentrated to the desired gelatin/water concentration discussed later. When the desired water/gelatin concentration is achieved, fresh, hot (e.g. from about 50 to 65° C.), deionized water is fed into the system at exactly the same rate as the effluent exiting the system; the effluent being water and all water soluble components. Once the water soluble components have been removed, the remaining gelatin/water solution is recycled for gelatin encapsulation.

The filters that can be employed in the concentration/diafiltration step are known and available in the art such as from Pall Fitron Company. Such filters include screen filters including open channel filters and the like. The selection of a suitable filter for the removal of gelatin must be capable of separating gelatin (typically having a molecular weight of from about 30,000 to 50,000) from smaller molecules.

The recovered aqueous gelatin solution is concentrated to a final solids (gelatin) concentration of at least between about 20% by weight, preferably from about 30% and 50%. The remaining concentrated waste gelatin is then concentrated using between about 1 and 20 diafiltration volumes of water, preferably between about 3 and 10 diafiltration volumes to provide recovered gelatin that is sufficiently pure to permit reuse and which leaves the diafiltration assembly 16 via a conduit 26. A portion of the purified recycled gelatin may be sent back to the gelatin dissolving step via a conduit 28 to remove additional impurities from the gelatin to thereby obtain an even purer product.

Impurities such as dyes, actives, water, preservatives and glycerin can be removed from the diafiltration assembly via conduit 30.

In some instances, dyes and pigments that are used to color gelatin capsules have an affinity for the gelatin in the waste stream. Recovery of the gelatin alone may, therefore, require that steps be taken to eliminate this affinity so that the dyes can be removed. In general, it is necessary to take these steps following the hot filtration process and prior to the concentration/diafiltration process.

Suitable methods for eliminating the affinity between dyes and/or pigments and the gelatin include use of, for example, activated clay, carbon cartridge filtration; carbon slurry formation followed by filtration to remove the carbon; pH adjustment to eliminate adhesion of the dye to the gelatin, followed by direct diafiltration to remove the dyes, and then adjustment of the pH back to the normal processing pH (e.g. from about 5 to 7); or, a combination of these methods.

If an affinity exists between the dyes and/or pigments, once the affinity has been eliminated, diafiltration can be performed to obtain recovered gelatin. It is understood that the recycling system described can be incorporated into a conventional encapsulation apparatus to provide repeated or continual recycling of waste encapsulation materials.

It will thus be seen that the goals set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

What is claimed is:

1. A process for the recovery and purification of waste gelatin which comprises the steps of:

(a) dissolving gelatin and other soluble components of a waste gelatin material in a solvent such that a dispersion comprising a gelatin-containing solution dispersed within the remaining components of the waste is formed;

(b) permitting the dispersion to settle into an upper oil phase and a lower solvent based gelatin-containing solution phase;

(c) separating the lower phase from the upper phase; and (d) diafiltering the lower phase until a desired concentration of recyclable gelatin is achieved.

2. The process of claim 1 further comprising hot filtering the lower phase to form a hot filtered lower phase comprising a filtrate and forwarding the filtrate to the diafiltration step.

3. The process of claim 1 wherein the solvent is water.

4. The process of claim 3 wherein the water is deionized water.

5. The process of claim 4 wherein the deionized water is preheated to from about 45° to 70° C.

6. The process of claim 1 further comprising the step of agitating the waste material to further facilitate dissolution of the gelatin.

7. The process of claim 1 comprising concentrating the recyclable gelatin to a final solids concentration of at least about 20%.

8. The process of claim 7 wherein the recyclable gelatin has a final solids concentration of from about 30 to 50%.

9. The process of claim 1 further comprising recycling a portion of the recovered gelatin to step (a).

10. The process of claim 2 further comprising removing dyes and pigments from the filtrate prior to the diafiltration step.

11. The process of claim 2 comprising hot filtering the lower phase at a temperature of from about 45 to 70° C.

12. The process of claim 2 further comprising treating the hot filtered lower phase to eliminate any affinity between dyes or pigments and the gelatin contained within the hot filtered lower phase.

13. The process of claim 1 further comprising recovering at least one component of the upper oil phase.

14. The process of claim 1 comprising recovering at least one component of the upper oil phase selected from the group consisting of dyes, actives, oils, preservatives and glycerin.

15. The process of claim 14 wherein said at least one component of the upper oil phase are actives.

16. The process of claim 1 wherein the step of diafiltering the lower phase comprises separating impurities from the gelatin.

17. The process of claim 16 comprising recovering at least one of the impurities.

18. The process of claim 17 wherein the impurities are selected from the group consisting of dyes, actives, water, preservatives and glycerin.

19. The process of claim 18 wherein said impurity is glycerin.

* * * * *